July 16, 1963 C. H. PROPSTER, JR 3,098,221

DISPLAY DEVICE HAVING A RETENTIVE MEMORY

Filed Sept. 13, 1961 3 Sheets-Sheet 1

INVENTOR.
CHARLES H. PROPSTER JR.
BY William C. Cahill

July 16, 1963 C. H. PROPSTER, JR 3,098,221
DISPLAY DEVICE HAVING A RETENTIVE MEMORY
Filed Sept. 13, 1961 3 Sheets-Sheet 2

INVENTOR.
CHARLES H. PROPSTER, JR.
BY William C. Cahill

July 16, 1963 C. H. PROPSTER, JR 3,098,221
DISPLAY DEVICE HAVING A RETENTIVE MEMORY
Filed Sept. 13, 1961 3 Sheets-Sheet 3
| | D | C | B | A |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |
FIG. 3
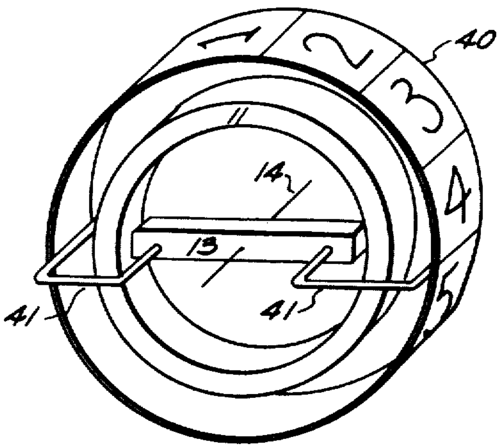
FIG. 4
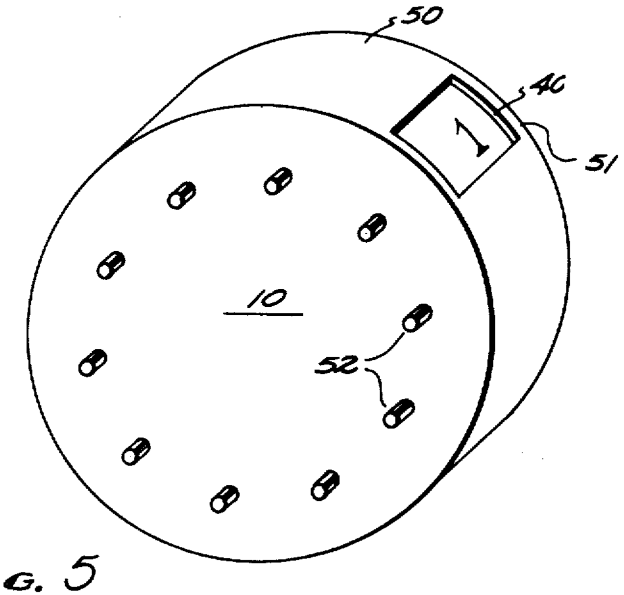
FIG. 5
INVENTOR
CHARLES H. PROPSTER, JR.
BY William C. Cahill

3,098,221
DISPLAY DEVICE HAVING A RETENTIVE MEMORY

Charles H. Propster, Jr., San Jose, Calif., assignor to General Electric Company, a corporation of New York Filed Sept. 13, 1961, Ser. No. 137,838
8 Claims. (Cl. 340—324)

This invention relates to display devices and more particularly to a display device having a retentive memory.

It is frequently desirable to have a display device which will give a visual indication of an electrical signal; for example, it may be desired to have a visual display responsive to a binary input signal. Such visual displays may conveniently be used with a computer or the like to give an easily comprehendible output indication of an electrical device. If it is desired to have an output indication having more than one significant figure, it becomes necessary to provide a plurality of such visual display devices, with the devices being positioned in closely spaced relation.

Several arrangements for providing such a visual display have been suggested in the past, but these previously suggested arrangements have suffered from a number of inherent defects. For example, it has been suggested that the symbols to be displayed be arranged in spaces on the face of a belt mounted on two sprocket wheels. Upon closing of a circuit for a suitable motor device, the wheels are caused to rotate to a position where a selected symbol is displayed through a viewing window. When a selected symbol appears at the window, the driving motor is then de-energized. However, in such an arrangement, the power consumption of the motor is relatively high, the provision of the two wheels and the belt of necessity requires a relatively bulky installation, and the response time of the device is quite slow.

In another form of display device known in the prior art, an annular soft iron core is provided with a plurality of windings spaced about its circumference. A permanent magnet rotor is provided within the annular core and display means are provided which are responsive to the position of the permanent magnet rotor. In operation, an electric pulse is provided to selected windings on the core which sets up electromagnetic poles in the soft iron core. The permanent magnet rotor then aligns itself with the electromagnetic poles, thereby bringing a specific symbol into position where it is visible. When the pulse disappears from the winding, the electromagnetic poles also disappear and the device then depends upon the attraction between the permanent magnet rotor and the soft iron core to retain the desired symbol in a viewing position. While such a device is less bulky and requires less power consumption than the previously described motor driven arrangement, it still requires a pulse of relatively large power content to bring the rotor into the desired position. Such a device also requires a pulse of relatively long time duration, since the pulse must be maintained until the rotor assumes the desired position which usually takes at least one-half second.

While such devices are of a size such that they may be conveniently positioned to display information having a plurality of significant figures, they depend solely upon the magnetic attraction between the permanent magnet rotor and the soft iron core to retain a particular display after the pulse ceases. If for any reason the display should become disturbed and the rotor caused to move to a new position, the rotor would then become attracted to the soft iron core at this new position and would then display a new symbol rather than the one commanded by the most recent pulse applied to the windings.

It is accordingly an object of this invention to provide an improved display device.

It is another object of this invention to provide an improved display device for effecting a visual indication of an electrical signal. It is another object of this invention to provide a display device having retentive memory characteristics for effecting a visual indication of an electrical signal applied thereto.

It is another object of this invention to provide a display device for effecting a visual indication of an electrical signal applied thereto which is responsive to applied electrical signals of short duration.

It is yet another object of this invention to provide a display device for effecting a visual indication of an electrical signal applied thereto which is of such size that it can conveniently be used with other similar display devices to form a display comprising more than one significant figure.

Briefly stated, and in accordance with one embodiment of the invention, the display device includes a ring of magnetic material having a substantially square hysteresis loop characteristic. In such material, once a flux pattern is established by magnetically saturating the material in a given direction, the flux pattern is retained until the condition of saturation is specifically destroyed (usually by saturating in an opposite direction). The magnetic ring has a continuous winding thereupon which has a plurality of spaced-apart terminals connected thereto. Each terminal corresponds to a different one of the digits or symbols which the device is capable of displaying. A magnetic member is rotatably positioned within the ring to pivot upon the axis of the ring. Visual display means are connected to this rotatable member and are responsive to the angular position of the rotatable member. In operation, a saturating pulse of sufficient magnitude to reverse the retentive flux in the ring from one angular direction to the other angular direction is applied between the terminal corresponding to the symbol which is to be displayed and the diametrically opposed terminal. The current in the pulse sees the two halves of the continuous winding electrically connected in parallel and divides substantially equally, with one half of the current flowing in each of the two halves of the continuous winding. The current thereby establishes a retentive magnetic flux in a first angular direction in a first selected half portion of the ring and a retentive magnetic flux in the opposite angular direction in the other half portion of the ring. This causes the rotatable magnetic member to rotate and align itself with the energized terminals, which in turn brings the desired symbol into a visible position.

For a complete understanding of the invention, reference may be had to the accompanying figures, in which:

FIG. 3 shows, in tabular form, a binary code which may be used with the circuitry of FIGURE 2;

FIG. 4 shows, in perspective, a partially assembled view of a display device; and FIG. 5 shows, in perspective, an assembled display device.

Figure 1:
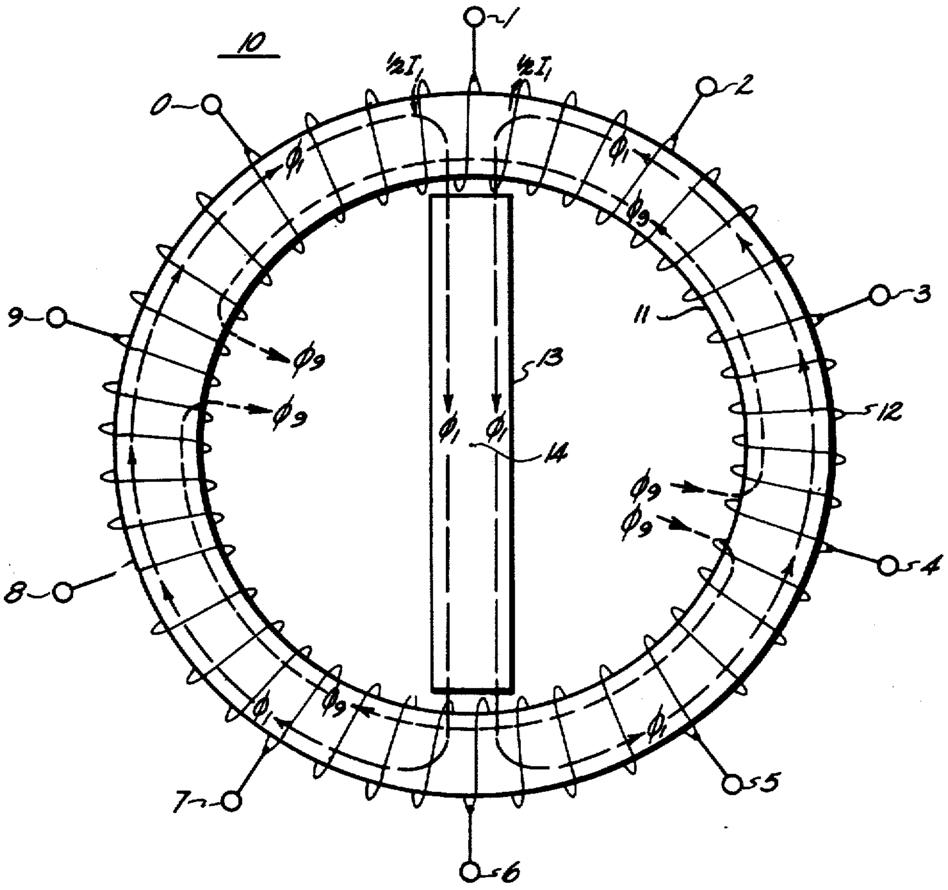
FIG. 1 shows, in plan form, portions of a display device using the invention.

Referring now to FIGURE 1, therein is shown a portion of a visual display device. The device 10 includes a ring or annular member 11 which, in accordance with the invention, is formed from material which exhibits a substantially square or rectangular hysteresis loop characteristic. Such material has a retentive flux characteristic, that is, once a magnetic flux pattern is established by magnetically saturating the material in one direction, the established pattern will remain until a new flux pattern is established by magnetically saturating the material in an opposite direction. Ring 11 has a continuous winding 12 wound thereabout. The winding 12 has a plurality of terminals 0, 1, 2, 3, 4, 5, 6, 7, 8 and 9 connected at spaced positions thereto, with each of these terminals being associated with a different respective symbol which may be displayed. For example, terminal 0 may correspond to the decimal digit "0," the terminal 1 to the decimal digit "1," etc. A magnetic member 13 is mounted within the ring 11, and is rotatable about the axis 14 of the ring 11. This member 13 may be of magnetizable material, such as soft iron, or it may be a permanent magnet.

To illustrate the operation of the device 10, it will be assumed that a positive-going saturating pulse is applied between the terminal 1 and the terminal which is diametrically opposed thereto, which would be the terminal 6. The electric current content of the pulse, which may be termed $I_1$, sees the two halves of the continuous winding 12 as being electrically in parallel between the terminals 1 and 6. Since each of the two halves of the continuous winding 12 presents substantially the same impedance to any electric current, the current $I_1$ divides into two substantially equal portions, with a first half flowing in one-half of the continuous winding 12 and the other half flowing in the other half of the continuous winding 12. This current establishes a retentive magnetic flux which, as shown in FIGURE 1, is in a first angular direction in one-half portion of the ring 11 and the other angular direction in the other half portion of the ring 11. The flux $\Phi_1$ creates electromagnetic poles in the ring 11 which cause the member 13 to rotate until it is in alignment with terminals 1 and 6, the member 13 thereby providing a low reluctance return path for the retentive magnetic flux. If the member 13 is a permanent magnet, then it will rotate until the North and South poles are aligned with terminals 1 and 6. If the member 13 is of magnetic material (but not a permanent magnet), then the member 13 will rotate, as before, until it is aligned with terminals 1 and 6; however, in the latter case, there will be two positions of the member 13 for each pair of terminals having a saturating pulse applied therebetween. Accordingly, the device of the present invention may be constructed to yield a number of indications corresponding to one-half of the number of input terminals; or alternatively, by providing a permanent magnet as member 13, the device may be adapted to yield a number of indications equal to the number of input terminals.

When the energizing pulse has been removed from the continuous winding 12, the flux $\Phi_1$, because of the retentive magnetic characteristics of the ring 11, remains in the ring 11 and member 13 as shown. Thus, should the member 13 ever, for any reason, become out of alignment with the terminals 1 and 6 before any further energizing pulses are applied to the continuous winding 12, the flux $\Phi_1$ creates a positive torque to realign the member 13 in its desired position. Also, the time duration of the energizing pulse need not be as long as it takes the member 13 to assume its desired angular position. Instead, the energizing pulse need only be of sufficient strength to cause the magnetic saturation of the ring 11. Thus, a saturating pulse of about 100 microsecond duration is sufficient, even though it may take about one-half second for the member 13 to become properly aligned. Because of the rapidity with which the direction of saturation may be changed, a single driving means may serve many display devices on a time-sharing basis.

In the device shown in FIG. 1, the current pulses are connected to continuous winding 12 through diametrically opposed terminals. If desired, the current pulses could be applied to winding 12 through any selected pairs of spaced terminals, thereby establishing retentive magnetic flux in opposite angular directions in two selected complementary portions of ring 11. It would then be necessary to provide a rotatable member 13 shaped so as to provide a low reluctance path for the retentive flux between the portions of ring 11 adjacent the connections of the selected pair of terminals to continuous winding 12.

When it is desired to display a subsequent symbol, a subsequent saturating pulse may be applied between the corresponding selected pair of opposed terminals. For example, if it is desired to exhibit the decimal digit "9," a positive going pulse may be applied between terminal 9 and its opposed terminal 4. This establishes the flux $\Phi_9$ as shown in FIG. 1 and the member 13 rotates into alignment therewith. In the case just illustrated, the retentive flux between terminals 4 and 6 and terminals 9 and 1 is reversed and the retentive flux in the remainder of the ring 11 remains in the same angular direction.

The continuous winding, described previously, may take the form of a plurality of discrete windings. For example, referring to FIG. 1, a pair of terminals may be substituted for each terminal 1, 2 . . . 0. Each terminal of a pair of terminals may then be connected to immediately adjacent portions of the winding, and the winding discontinued between the connections, thus providing a plurality of discrete windings about the annular member 11. As a result of a winding arrangement of this nature, a variety of energizing arrangements are possible.

Figure 2:
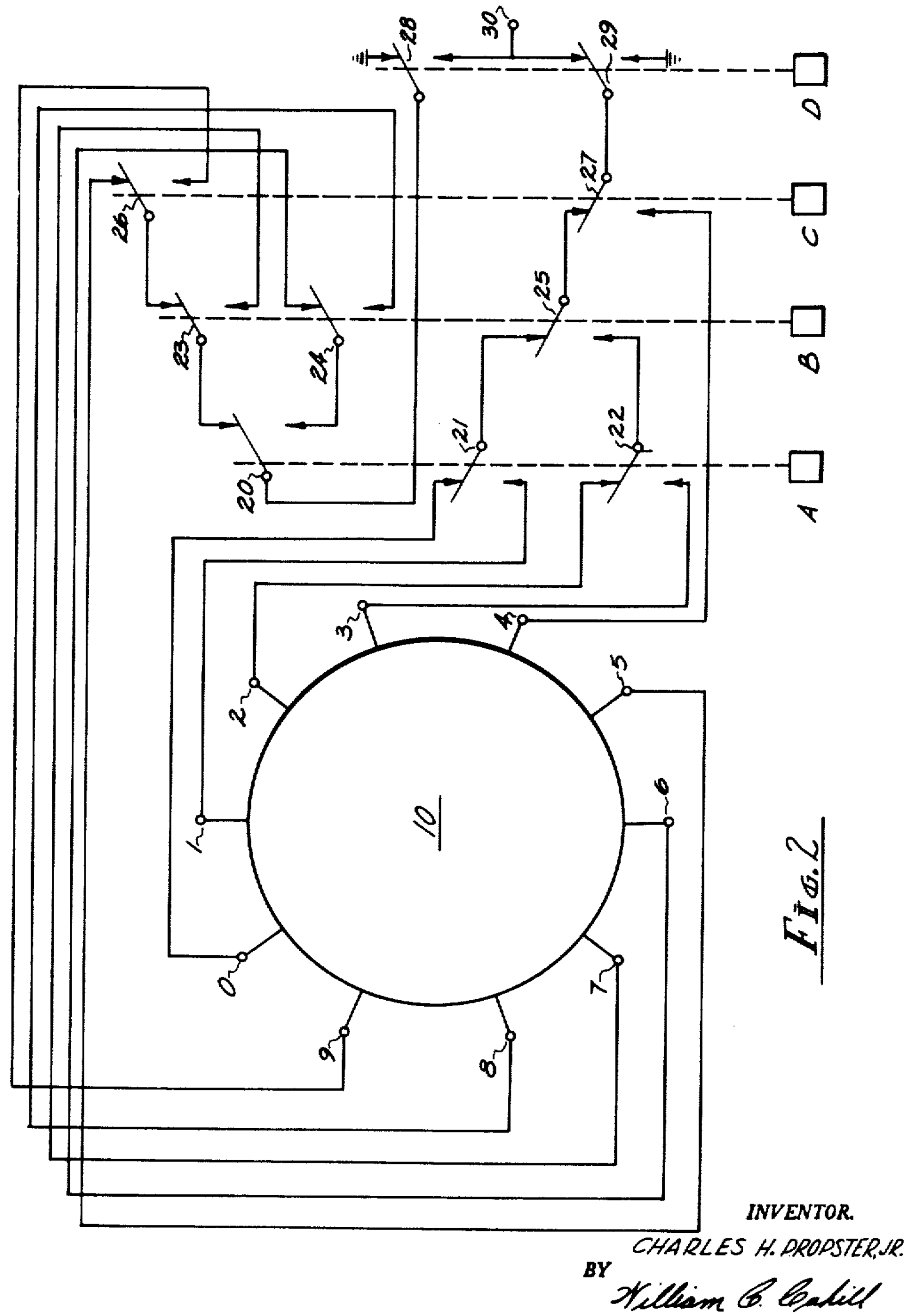
FIG. 2 shows circuit means for selectively energizing a display device such as is shown in FIGURE 1.

FIGURE 2 shows circuit means which may be used to selectively energize the terminals of the display device 10, such that the device may be used to give a visual representation of an applied binary signal. Therein are shown relays A, B, C, and D. Relay A controls the positions of switches 20, 21 and 22. Relay B controls the positions of switches 23, 24 and 25. Relay C controls the positions of switches 26 and 27, and relay D controls the positions of switches 28 and 29.

FIGURE 3 shows, in tabular form, a binary code which may be used with the relays and circuit arrangements shown in FIG. 2. For example, FIG. 2 shows the positions of the switches when all of the relays are in their deenergized condition, which, according to the table of FIG. 3, corresponds to the decimal digit "0." In this condition, when a positive going saturating pulse is applied to terminal 30, it is connected through switches 29, 27, 25 and 21 to the terminal 0, and the diametrically opposed terminal, the terminal 5, is connected to ground through switches 26, 23, 20 and 28.

Referring now to FIG. 4, therein is shown, in perspective form, the view of a partially assembled display device. The rotatable member 13 is shown positioned within the ring 11. For clarity's sake, the windings have been omitted from the ring 11. A drum 40 is shown positioned concentric to and surrounding the ring 11, with the drum 40 having the desired symbols to be displayed upon its outer surface. The member 13 and the drum 40 are mechanically connected by the members 41, such that the angular position of member 13 determines the angular position of the drum 40.

Referring now to FIG. 5, therein is shown a view of an assembled display device such as has been described. The device 10 is enclosed in a housing 50, which has an aperture or window 51 therein. The symbol to be viewed is shown through this window 51. The particular symbol being viewed is dependent upon the angular position of the drum 40, which is in turn dependent upon the angular position of the rotatable member, as has been previously described. Electrical connection to the terminals of the continuous winding may be facilitated by providing a plurality of terminals 52 attached to the housing 50. Each terminal 52 is connected to a corresponding terminal of the continuous winding within the housing 50.

While the principles of the invention have now been made clear in illustrative embodiments, there will be immediately obvious to those skilled in the art many modifications in structure, arrangement, proportions, the elements, materials and components, used in the practice of the invention, and otherwise, which are particularly adapted for specific environments and operating requirements, without departing from those principles. The appended claims are, therefore, meant to cover and embrace any such modifications, within the limits only of the true spirit and scope of the invention.

What is claimed as new and desired to secure by Letters Patent of the United States is:

1. A display device for presenting a selected one of a plurality of visual symbols comprising, a ring of magnetic material having a substantially rectangular hysteresis loop characteristic, an electrical winding on said ring, a plurality of terminals each connected to said winding at a respective different spaced position on said winding, means for energizing said winding through a selected diametrically opposed pair of said terminals for establishing a retentive magnetic flux in a first angular direction in a selected half portion of said ring and a retentive magnetic flux in the opposite angular direction in the other half portion of said ring, means comprising a rotatable magnetic member positioned within said ring and adapted to rotate about the axis of said ring for providing a low reluctance path for said retentive magnetic flux between the diametrically opposed portions of said ring adjacent to the positions where said selected pair of terminals are connected to said winding, and visual display means responsive to the angular position of said rotatable magnetic member, said visual display means comprising a drum concentrically positioned around said ring, said drum having symbols to be displayed upon its outer surface, and means connecting said drum to said rotatable magnetic member.

2. A display device for presenting a visual display of a selected one of a plurality of symbols, said display device comprising a ring of magnetic material having a substantially rectangular hysteresis loop characteristic, an electrical winding on said ring, a plurality of terminals each connected to said winding at a respective different spaced position on said winding, each of said terminals corresponding to a different respective one of said plurality of symbols, means for energizing said winding through a selected diametrically opposed pair of said terminals for establishing a retentive magnetic flux in a first angular direction in a selected half portion of said ring and a retentive magnetic flux in the opposite angular direction in the other half portion of said ring, means comprising a rotatable magnetic member positioned within said ring and adapted to rotate about the axis of said ring for providing a low reluctance path for said retentive magnetic flux between the diametrically opposed portions of said ring adjacent to the positions where said selected pair of terminals are connected to said winding, and means responsive to the angular position of said rotatable magnetic member for displaying a visual symbol.

3. A display device for presenting a visual display of a selected one of a plurality of symbols, said display device comprising a ring of magnetic material having a substantially rectangular hysteresis loop characteristic, an electrical winding on said ring, a plurality of terminals each connected to said winding at a respective different spaced position on said winding, each of said terminals corresponding to a different respective one of said plurality of symbols, means for energizing said winding through a selected diametrically opposed pair of said terminals for establishing a retentive magnetic flux in a first angular direction in a selected half portion of said ring and a retentive magnetic flux in the opposite angular direction in the other half portion of said ring, means comprising a rotatable magnetic member positioned within said ring and adapted to rotate about the axis of said ring for providing a low reluctance path for said retentive magnetic flux between the diametrically opposed portions of said ring adjacent to the positions where said selected pair of terminals are connected to said winding, and visual display means responsive to the angular position of said rotatable magnetic member, said visual display means comprising a drum concentrically positioned about said ring, said drum having a plurality of symbols upon its outer surface, means connecting said drum to said rotatable magnetic member, and a housing member surrounding said drum and having an aperture therein through which a selected symbol may be viewed.

4. A display device comprising, a ring of magnetic material having a substantially rectangular hysteresis loop characteristic, an electrical winding on said ring, a plurality of terminals each connected to said winding at a respective different spaced position on said winding, means for energizing said winding through a selected pair of said terminals for establishing a retentive magnetic flux in a first angular direction in a first selected portion of said ring and a retentive magnetic flux in the opposite ring complementary to said first selected portion of said ring, means comprising a permanently magnetized rotatable member positioned within said ring and adapted to rotate about the axis of said ring for providing a low reluctance path for said retentive magnetic flux between the portions of said ring adjacent to the positions where said selected pair of terminals are connected to said winding, and display means responsive to the position of said permanently magnetized rotatable member.

5. A display device comprising, a ring of magnetic material having a substantially rectangular hysteresis loop characteristic, an electrical winding on said ring, a plurality of terminals each connected to said winding at a respective different spaced position on said winding, means for energizing said winding through a selected diametrically opposed pair of said terminals for establishing a retentive magnetic flux in a first angular direction in a selected half portion of said ring and a retentive magnetic flux in the opposite angular direction in the other half portion of said ring, means comprising a permanently magnetized rotatable member positioned within said ring and adapted to rotate about the axis of said ring for providing a low reluctance path for said retentive magnetic flux between the diametrically opposed portions of said ring adjacent to the positions where said selected pair of terminals are connected to said winding, and display means responsive to the angular position of said permanently magnetized rotatable member.

6. A display device for presenting a visual display of a selected one of a plurality of symbols, said display device comprising a ring of magnetic material having a substantially rectangular hysteresis loop characteristic, an electrical winding on said ring, a plurality of terminals each connected to said winding at a respective different spaced position on said winding, each of said terminals corresponding to a different respective one of said plurality of symbols, means for energizing said winding through a selected diametrically opposed pair of said terminals for establishing a retentive magnetic flux in a first angular direction in a selected half portion of said ring and a retentive magnetic flux in the opposite angular direction in the other half portion of said ring, means comprising a permanently magnetized rotatable member positioned within said ring and adapted to rotate about the axis of said ring for providing a low reluctance path for said retentive magnetic flux between the diametrically opposed portions of said ring adjacent to the positions where said selected pair of terminals are connected to said winding, and visual display means responsive to the angular position of said rotatable magnetic member, said visual display means comprising a drum concentrically positioned about said ring, said drum having a plurality of symbols upon its outer surface, means connecting said drum to said permanently magnetized rotatable member, and a housing member surrounding said drum and having an aperture therein through which a selected symbol may be viewed.

7. A display device comprising, a ring of magnetic material having a substantially rectangular hysteresis loop characteristic, an electrical winding on said ring, a plurality of terminals each connected to said winding at a respective different spaced position on said winding, means for energizing said winding through a selected pair of said terminals for establishing a retentive magnetic flux in a first angular direction in a first selected portion of said ring and a retentive magnetic flux in the opposite angular direction in a second selected portion of said ring complementary to said first selected portion of said ring, means comprising a rotatable magnetic member positioned within said ring and adapted to provide a low reluctance path for said retentive magnetic flux between the portions of said ring adjacent to the positions where said selected pair of terminals are connected to said winding, and display means responsive to the position of said rotatable magnetic member.

8. A display device comprising, a ring of magnetic material having a substantially rectangular hysteresis loop characteristic, an electrical winding on said ring, a plurality of terminals each connected to said winding at a respective different spaced position on said winding, means for energizing said winding through a selected diametrically opposed pair of said terminals for establishing a retentive magnetic flux in a first angular direction in a selected half portion of said ring and a retentive magnetic flux in the opposite angular direction in the other half portion of said ring, means comprising a rotatable magnetic member positioned within said ring and adapted to provide a low reluctance path for said retentive magnetic flux between the diametrically opposed portions of said ring adjacent to the positions where said selected pair of terminals are connected to said winding, and display means responsive to the angular position of said rotatable magnetic member.

References Cited in the file of this patent

UNITED STATES PATENTS

| | | |
|---|---|---|
| 2,827,626 | De Motte | Mar. 18, 1958 |
| 2,943,313 | Gordon et al. | June 28, 1960 |
| 3,009,140 | Gordon | Nov. 14, 1961 |

UNITED STATES PATENT OFFICE
CERTIFICATE OF CORRECTION

Patent No. 3,098,221

July 16, 1963

Charles H. Propster, Jr.

It is hereby certified that error appears in the above numbered patent requiring correction and that the said Letters Patent should read as corrected below.

Column 6, line 11, after "opposite" insert -- angular direction in a second selected portion of said --.

Signed and sealed this 7th day of January 1964.

(SEAL)
Attest:

ERNEST W. SWIDER
Attesting Officer

EDWIN L. REYNOLDS
Acting Commissioner of Patents